(12) United States Patent
Hof et al.

(10) Patent No.: US 6,523,443 B1
(45) Date of Patent: *Feb. 25, 2003

(54) PROCESS FOR MANUFACTURING OPTICAL SURFACES AND SHAPING MACHINE FOR CARRYING OUT THIS PROCESS

(75) Inventors: Albrecht Hof, Aalen (DE); Klaus Mehlkopp, Alsdorf (DE)

(73) Assignees: Carl-Zeiss-Stiftung, Heidenheim/Brenz (DE); Fraunhofer-Gesellschaft zur Forderung der angewandten Forschung e.V. (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/051,629
(22) PCT Filed: Oct. 11, 1996
(86) PCT No.: PCT/DE96/01947
§ 371 (c)(1), (2), (4) Date: Dec. 30, 1998
(87) PCT Pub. No.: WO97/13603
PCT Pub. Date: Apr. 17, 1997

(30) Foreign Application Priority Data

Oct. 14, 1995 (DE) ............................... 195 38 274

(51) Int. Cl.⁷ .............................. B23B 41/00; B23B 7/00
(52) U.S. Cl. ............................. 82/1.4; 82/11.3; 82/118; 82/133
(58) Field of Search ................... 82/1.11, 118, 117, 82/123, 132, 133, 134, 142, 12, 11.3, 11.4, 1.4, 1.5

(56) References Cited

U.S. PATENT DOCUMENTS

| | | | | | |
|---|---|---|---|---|---|
| 4,254,065 A | * | 3/1981 | Ratkowski | .................. | 264/2.5 |
| 4,455,901 A | * | 6/1984 | Council, Jr. | .................... | 82/12 |
| 4,711,035 A | * | 12/1987 | Logan et al. | ................. | 33/200 |
| 4,839,545 A | * | 6/1989 | Chitayat | ...................... | 310/12 |
| 5,073,734 A | * | 12/1991 | Combette | ..................... | 310/65 |
| 5,417,130 A | * | 5/1995 | Dorsch | ......................... | 82/1.11 |
| 5,485,771 A | * | 1/1996 | Brennan | ..................... | 82/1.11 |
| 5,497,683 A | * | 3/1996 | Hattori | .......................... | 82/18 |
| 5,743,159 A | * | 4/1998 | Svochak | ...................... | 82/168 |
| 5,794,498 A | * | 8/1998 | Chaloux | ...................... | 82/1.11 |

FOREIGN PATENT DOCUMENTS

JP 59-110362 * 6/1984

* cited by examiner

Primary Examiner—Henry Tsai
(74) Attorney, Agent, or Firm—David C. Purdue; John C. Purdue

(57) ABSTRACT

The present invention is a process by which optical surfaces of lenses, particularly plastic progressive lenses and molding shells for producing lenses are manufactured directly in a single step according to didicidual data. A blank from which an optical surface or a molding shell is to be manufactured is held at the workpiece carrier of a spindle axis (Z axis) of a shaping machine and is directly turned into its final form by a turning tool which can move relative to the blank (in the X axis), i.e., transversely to the direction of displacement of the tool. During each rotation of the spindle, the turning tool is incrementally adjusted towards or away from the blank depending on the characteristic surface data, which may be predetermined or calculated on-line.

18 Claims, 7 Drawing Sheets

PROCESS FOR MANUFACTURING OPTICAL SURFACES AND SHAPING MACHINE FOR CARRYING OUT THIS PROCESS

CROSS-REFERENCE TO RELATED APPLICATIONS (NOT APPLICABLE)

STATEMENT REGARDING FEDERALLY SPONSORED RESEARCH OR DEVELOPMENT (NOT APPLICABLE)

BACKGROUND OF THE INVENTION

1. Field of the Invention

The invention relates to a method for producing optical surfaces, in particular ophthalmic lenses and shell moulds for producing ophthalmic lenses (in particular aspherical plastic lenses), and to a processing machine for carrying out the method.

2. Description of the Related Art Including Information Disclosed Under 37 CFR 1.97 and 1.98.

Optical surfaces and, in particular, ophthalmic lenses having a complicated geometry, for example continuous vision lenses, can presently be produced from silicate glass or from plastic. As silicate lenses, they are produced by grinding and subsequent polishing. Plastic lenses are produced by casting in a previously fabricated female mould. The female moulds, so-called shell moulds, are produced from silicate glass using the same method as in the fabrication of ophthalmic lenses, that is to say likewise by grinding and polishing.

It is a disadvantage of this mode of procedure that, particularly for the fabrication of ophthalmic lenses, all the required geometrical shapes must be kept in store.

It is also disadvantageous that in the case of multistage fabrication processes, the tolerances of the individual steps can unfavourably affect the end product. Correction strategies are very expensive and complicated. The situation becomes more complicated with each additional process step, since it is mostly possible to establish faults only at the conclusion of the process, and the cause can therefore possibly be located only with difficulty.

U.S. Pat. No. 5,320,006 has already disclosed the turning of the basic mould of plastic lenses on a suitable turning machine and subsequently processing them finally on a polishing machine, the curvature of the polishing tool being measured and used as control variable for the turning tool, in order to produce a blank which is matched as accurately as possible to the polishing tool, and thus to restrict polishing to a minimum. Leaving aside that an expensive polishing operation still remains, only spherical, possibly toroidally shaped spectacle lenses can be produced using this method. Continuous vision lenses have complicated aspherical shapes, and cannot be produced in this way.

It is the object of the invention to specify a method with which it is also possible to fabricate directly optical surfaces of geometrically complicated shape, and in particular ophthalmic lenses and shell moulds for producing ophthalmic lenses in accordance with individual data specification in a single process step, the aim being to necessitate no, or at least only a little, reworking to fabricate the optical surfaces and, in particular, the ophthalmic lenses and shell moulds for producing ophthalmic lenses.

According to the invention, this object is achieved by virtue of the fact that a blank for optical surface treatment or a blank of a shell mould is held on the workpiece support of a spindle axis (Z-axis) of a processing machine and is directly turned to its final shape by means of a turning tool which can execute a relative movement with respect to the blank (X-axis), it being the case that the turning tool can be moved transverse to the direction of tool movement and that during each spindle revolution the turning tool performs incremental infeeds in the direction of the blank or away from the latter in accordance with prescribed or online-calculated data of the surface.

Using the method according to the invention, a tool cutter can be moved so quickly that it is possible to machine out of a plastic blank the changes in height occurring in the circumferential direction, which are caused by the aspherical shape. The cutter can have a very small radius, as a result of which the engagement is virtually punctiform. However, the cutter can also have a radius of several millimeters. It can be fitted with a monocrystalline diamond.

The surface produced is generally already ready for use. Light reworking by polishing may still be required to produce the readiness for use. In this process, the shape is determined entirely by the turning process and is no longer changed by the polishing.

The surface can also be made ready for use by being dipped in lacquer, for example, as an alternative to polishing.

In addition to ophthalmic lenses, the method can also be used to produce shell moulds for producing ophthalmic lenses, for example of metal or ceramic. Here, as well, polishing is only necessary to a very slight extent. It is also possible to produce optical surfaces, for example other lenses or mirrors, having a complicated shape which is not rotationally symmetrical.

It is possible according to the invention advantageously to provide for the reaction force produced during the infeed to be balanced by static or dynamic counterbalancing.

For the purpose of fitting the lenses or mirrors, but in particular the spectacle lenses into the spectacle frame, marks must be provided on the surface which permit quick orientation. These marks, which it has so far been necessary to produce in addition using special diamond tools or with the aid of high-energy laser radiation, can now be directly coproduced during the processing operation, since it is possible to use a tool which works in a punctiform fashion. All the problems of reproducibility such as occur with each change of machine are thereby eliminated. Moreover, any symbols can be produced in a freely programmable fashion. Each lens can thereby be individually marked.

This relates in a similar way to the production of shell moulds, for example, for producing ophthalmic lenses. All the markings for later orientation of the lens and further symbols can be provided in the shell moulds, as well.

According to the invention, it is provided in an advantageous way that the turning tool executes a pivoting movement relative to the spindle. In this case, during turning the blank can additionally be pivoted about a centre point lying on the Z-axis. As an alternative to this, during turning the turning tool can also additionally be pivoted about a centre point lying on the Z-axis.

Since the sagging of the lens material (glass or plastic for lenses or mirrors) requires no quick tool movements, this movement can be replaced either by a slow Z-movement or by a pivoting movement which is superimposed on the quick Z-drive. The quick Z-movement must then have a travel of approximately 1 mm for the production of continuous vision lenses, for example. This mode of procedure has the particular advantage of reducing the region of the turning tool used for shaping. Irregular wear of the turning tool then has smaller effects.

A problem of every turning operation is the singularity in the middle of the workpiece. It can therefore be provided in a preferred way that the blank can be turned in two off-axis positions deviating slightly from the turning centre.

In this case, the blank is processed such that the respective turning centre is reached precisely only by the process in the respective other position. Thus, turning is not performed down to the spindle axis.

In the case of excessively large radial movements, the turning movement at the edge can run off the workpiece. This can be avoided according to the invention by varying the track spacings in the X-direction. This then also requires appropriate dynamics for this feed drive, which can be achieved, for example, by applying harmonic vibrations. Dynamic counterbalancing is also advantageous for this purpose. Dynamic counterbalancing requires that a second movement of a mass of the same size must be carried out with an opposite direction of movement. This colinear movement can be used for simultaneously processing the front and rear sides of, for example, a plastic lens or a second ophthalmic lens and/or a second shell mould for producing ophthalmic lenses. Depending on the surface design and the blank used, the counterbalancing of the two counterrotating quick tools, which is effected by the simultaneous processing the front and rear sides, can suffice in order to absorb the reaction force effected by the acceleration of the turning tools. If such balancing is not completely achieved, a third colinear counterbalancing may be required.

A consequence of this mode of operation is that working is essentially symmetrical on the front and rear sides of the blank. The desired optical effect is distributed uniformly over both surfaces. This comes close to the point of view, usual in precision optics, of the identical optical action of two surfaces, and opens up entirely new technical possibilities, since ophthalmic lenses have so far been configured with an aspherical or toroidal rear side.

Appropriate measuring systems for the linear and rotary movement are required to determine the position and detect the state of the blank and turning tool. It is provided by the invention in a preferred way that the positions of the turning tool and blank are sensed optoelectronically.

The position of the tool movement in the Z-direction should preferably be determined to an accuracy of at least 0.0005 mm.

Measuring systems with a resolution of at least 0.0005 mm and the required length are available, for example, as optoelectronically scanned scales or laser interferometers. Optoelectronic rotary transducers are suitable for determining the position of the turning movement. Tachometers are likewise available for determining the instantaneous movement speeds.

Furthermore, it can be provided in a way preferred by the invention that all the parameters describing the system state are fed to a digital control loop, and control is performed taking account of the calculated geometry of the optical surface, in particular an ophthalmic lens or a shell mould for producing ophthalmic lenses. The system state is described, in particular, by the position of the turning tool and that of the spindle and/or the blank, which are continuously measured and compared with the data to be achieved. Correction data are then determined therefrom for the infeed of the turning tool.

Conventional analogue controllers can also be used as an alternative to this.

Furthermore, it can be provided in a way preferred by the invention that the tool movement in the Z-direction is executed by means of at least one linear motor on low-friction bearings.

Furthermore, it can be provided in a way preferred by the invention that the spacing of the coils and magnets, and the bearing play are not varied by thermal influences.

Furthermore, it can be provided in a way preferred by the invention that Peltier cooling is used to cool the coil or the coils of the linear motor or motors.

It can also be provided in a way preferred by the invention that Peltier coolers are used in air cooling or liquid cooling.

The basic design of a suitable processing machine is realized in a way preferred by the invention such that mounted on a stiff machine bed is a spindle, on which it is possible to hold a blank for optical surface treatment, in particular an ophthalmic lens or a shell mould, a turning tool, which can be moved in the axial direction of the spindle (Z-axis), is mounted, the turning tool or the spindle can be moved on a carriage orthogonal to the axial direction of the spindle (X-axis), and the drive for the turning tool in the direction of the Z-axis is realized by a linear drive.

The incremental adjustment of the turning tool is accomplished by a linear drive. An electrodynatnic, hydraulic or pneumatic linear motor can be used for this purpose. The linear motor comprises a rotor and a stator.

Use is advantageously made for the dynamic counterbalancing of a second, identically designed linear motor which is colinear with the processing motor and is coupled mechanically to the housing or stator thereof via a stiff, force-closed connection. The motors are driven in opposite directions. In the case of hydraulic or pneumatic drives, dynamic counterbalancing can also be produced by two oppositely running pistons in a cylinder.

As an alternative, the dynamic forces of the quick tool drive can be introduced into a large mass (static counterbalancing). For this purpose, the quick tool drive is set directly onto a large mass of the machine bed. The X-carriage is arranged below the spindle. The large mass must be dimensioned such that the reaction movement from a movement of the quick tool drive remains substantially smaller than a few micrometers.

The bearing of the motor rotor is at the same time the bearing of the tool. Air-cushioned bearings, air-cushioned bearings with supporting magnet bearings, or hydraulic bearings can be used as bearings; said bearings permit movement with low friction in Z-direction, but are capable of absorbing transverse forces from the processing operation.

The drive forces are preferably produced by a single-phase or polyphase linear motor. Such a linear motor can be designed with a moving coil, or, alternatively, with a moving magnet. The second variant has the advantage that the power loss occurring in the coil can more easily be dissipated.

The particular advantage of such a tool drive also resides in the fact that the travel in the Z-direction is not limited by the machine elements bearing and linear motor. Travels in the Z-direction of a few 10 mm can be realized, the motor characteristic remaining constant over the entire adjustment range. This is advantageous, in particular, for controlling the motor.

It is possible to make use either directly of water cooling or, preferably, Peltier cooling with subsequent water cooling on the hot side. With Peltier cooling, the coil temperature can be controlled accurately to a constant temperature value, for example 0.1 K, with the result that the air gaps can be kept small and constant even in the case of different load conditions.

It is possible in the way already indicated above for the tool movement along the X-axis to be replaced by a pivoting movement which is superimposed on the quick Z-drive. The pivoting axis can in this case be mounted below the spindle or the tool drive.

As an alternative, it is also possible in this arrangement for the dynamic forces of the quick tool drive to be introduced into a large mass, for example into the machine bed. For this purpose, the rotary table must firstly be given a radius fitting the tool, and subsequently the spindle must be set on the rotary table at the same radius.

In order, as also indicated above, to be able to process the blank in two off-axis positions, the spindle can be arranged displaceably in the radial direction. For example, the tool holder could be brought sequentially by magnetic force into two switchable positions. Instead of a linear movement, it is also possible here to provide a rotary movement with a long pivoting radius. The additional travel in the Z-direction is insignificant, because the off-axis displacement is only very slight.

The movement of the second linear motor, which is intended to effect the dynamic counterbalancing, can be utilized to process the rear side of an optical surface, in particular of an ophthalmic lens, and/or possibly to process a second optical surface, in particular a second ophthalmic lens or a second shell mould for producing ophthalmic lenses, using the same optical data. In this case, the spindle is mounted coaxially with the blank and one linear drive each is mounted on the two sides of the blank. The second linear drive has an additional turning tool and a measuring system for determining the position of this turning tool, and the carriage for moving the blank along the X-axis is mounted below the spindle and bears the latter. The drives are coupled via a stiff base plate of the machine bed or, better, by a housing cage which symmetrically absorbs the forces.

According to the invention, it can additionally be provided that further dynamic counterbalancing is effected in this case by arranging colinearly with the two linear drives a third linear drive whose housing or stator is mechanically coupled to the housings or stators of the two other linear drives via the machine bed, and which is driven in a sense opposite to the direction of the force resulting from the movement of the first and second linear drives.

In addition to absorbing the reaction forces effected by the tool infeed, this variant has the further advantage that the processing forces on the workpiece are also largely rendered symmetrical.

The method is to be explained in more detail below with the aid of exemplary embodiments described below and illustrated in the accompanying drawing.

DETAILED DESCRIPTION OF THE INVENTION

Figure 1:
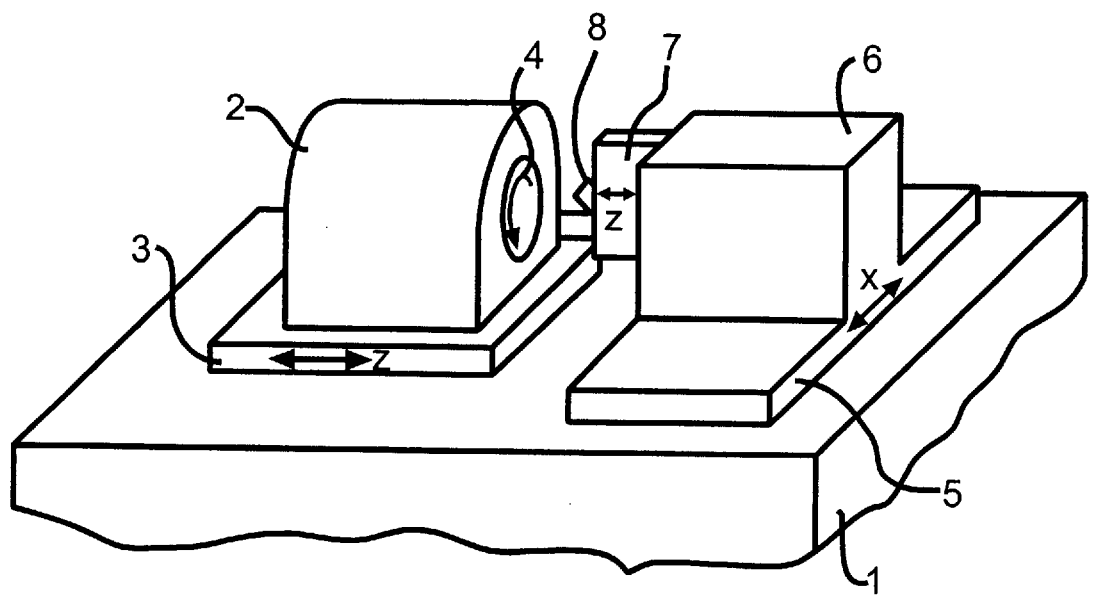
FIG. 1 shows the principle of the design of a processing machine for carrying out the method according to the invention, having linear axes.

FIG. 1 shows a processing machine for carrying out the method according to the invention. The processing machine is mounted on a stiff machine bed 1. The spindle 2 is mounted on a carriage 3 which can move along the Z-axis. The spindle 2 holds the blank (not shown here) in a workpiece support 4. The carriage 3 is brought into a suitable position for pre-setting, and then clamped fast for the duration of processing.

The tool drive 6, which is realized by a linear motor, is located on a further carriage 5, which can be moved in the X-direction. The rotor 7 of the tool drive 6 bears the turning tool 8.

Figure 2:
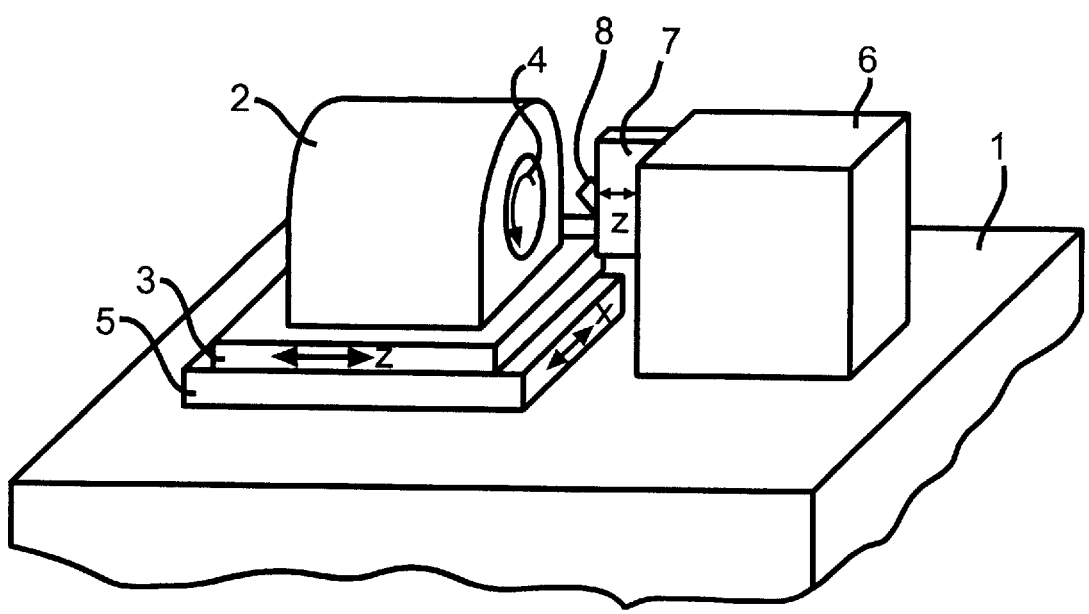
FIG. 2 shows a second variant for a processing machine.

FIG. 2 shows a variant of the processing machine in which it is not the tool drive 6, but the spindle 2 which is mounted on a carriage 5 which can be moved in the X-direction.

Figure 3B:
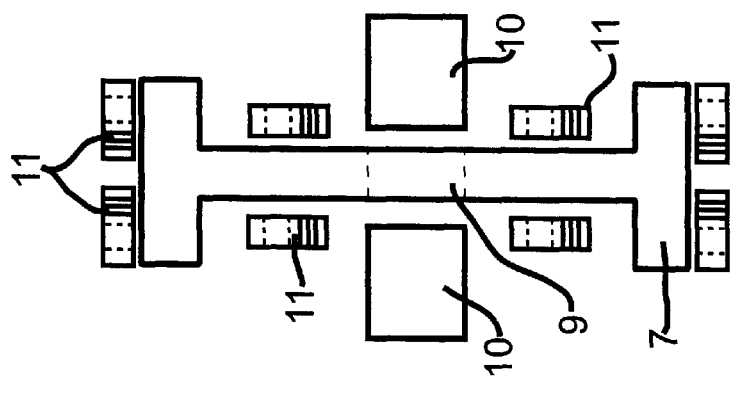
FIG. 3B is an end view of the electrodynamic linear drive illustrated in FIG. 3A.
Figure 3A:
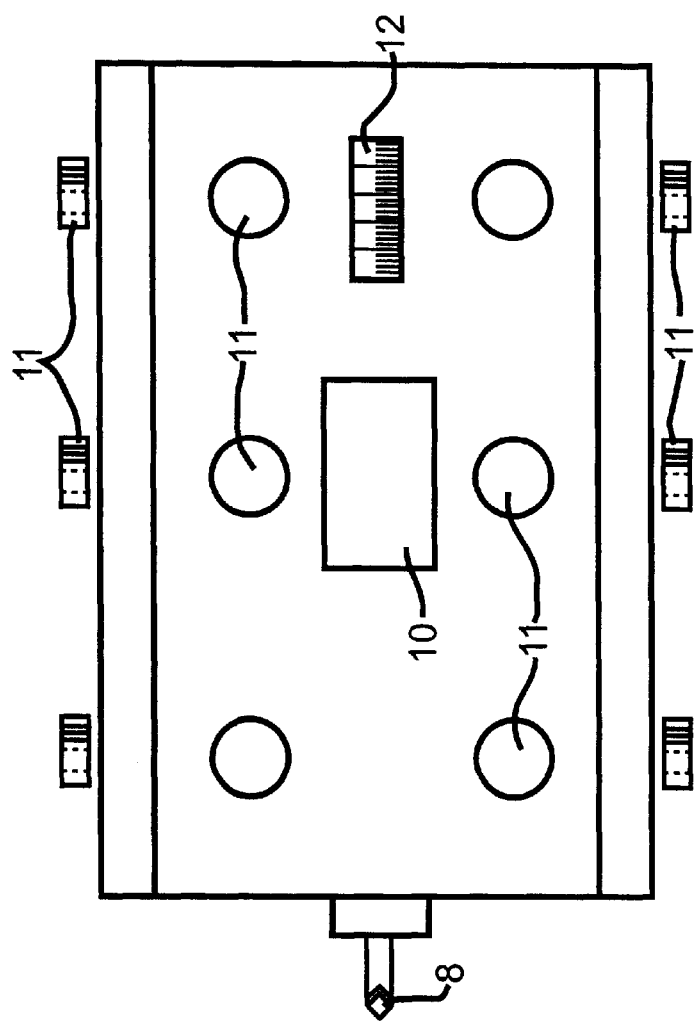
FIG. 3A is a top view of an electrodynamic linear drive for the turning tool.

The electrodynamic linear motor in accordance with FIGS. 3A and 3B represents a possible tool drive. The linear motor comprises a rotor 7, which is equipped with permanent magnets 9, and the stator coil system 10. The rotor 7 is mounted horizontally and vertically in air-cushioned bearings 11 in order to achieve movement with low friction. The rotor 7 bears a measuring system 12 for determining the position.

Figure 4:
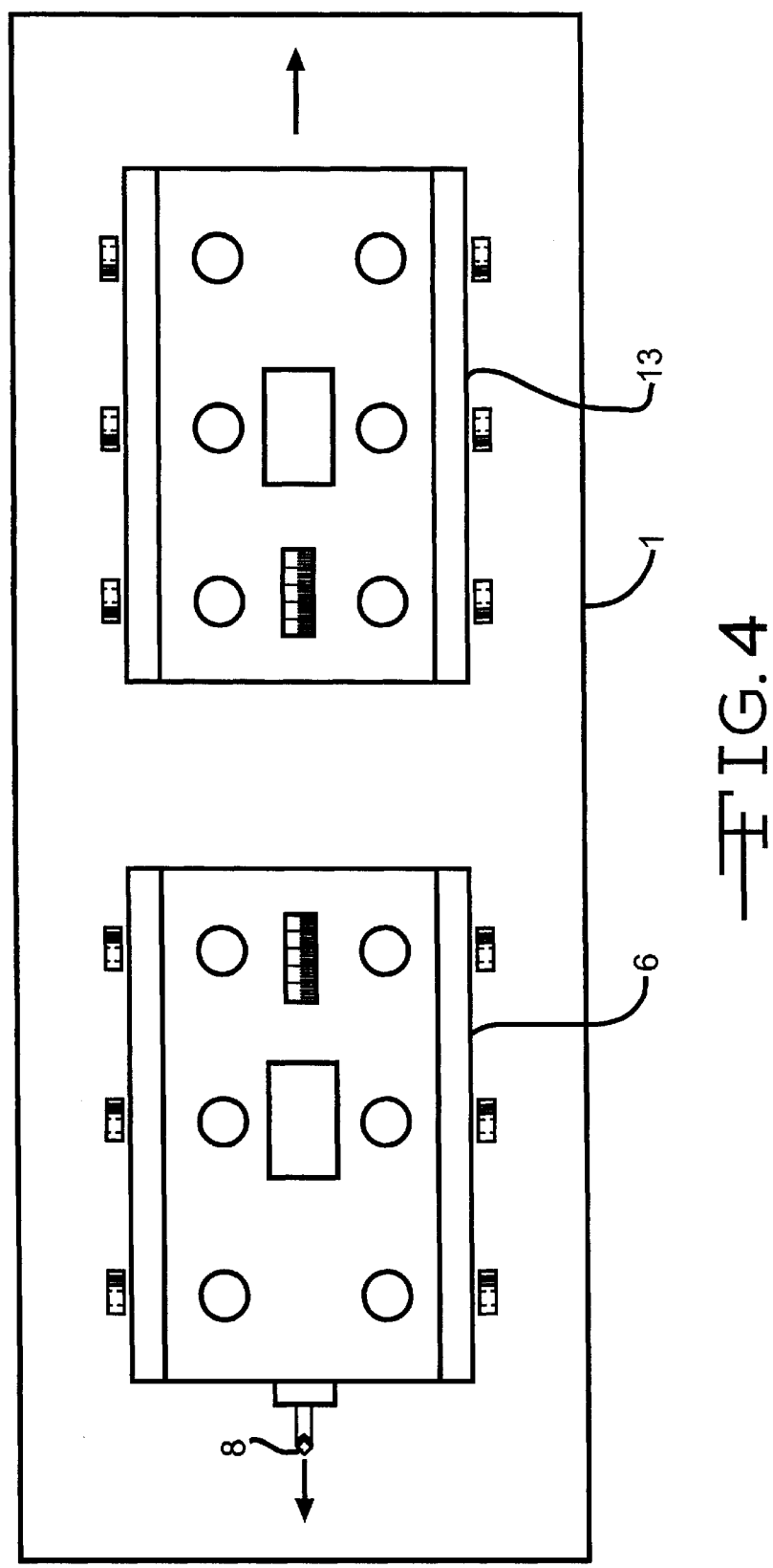
FIG. 4 shows a linear drive for the turning tool with dynamic counterbalancing.

FIG. 4 shows an example of dynamic counterbalancing of the system.

Provision is made for this purpose for a linear drive 13 which is colinear with the tool drive 6 and serves only to balance the reaction force produced in the case of the quick infeed movement. The stators of the two linear drives are coupled to one another in a force-closed fashion by the machine bed 1. The linear drives are driven simultaneously in opposite directions during the processing operation.

Reaction forces caused by the quick movement required for the turning tool 8 are balanced by the dynamic counterbalancing, and so any sort of unintentional movement of the turning tool is avoided, thus rendering possible the high surface quality of the processed spectacle lens and the accuracy of its optical geometry.

Figure 5:
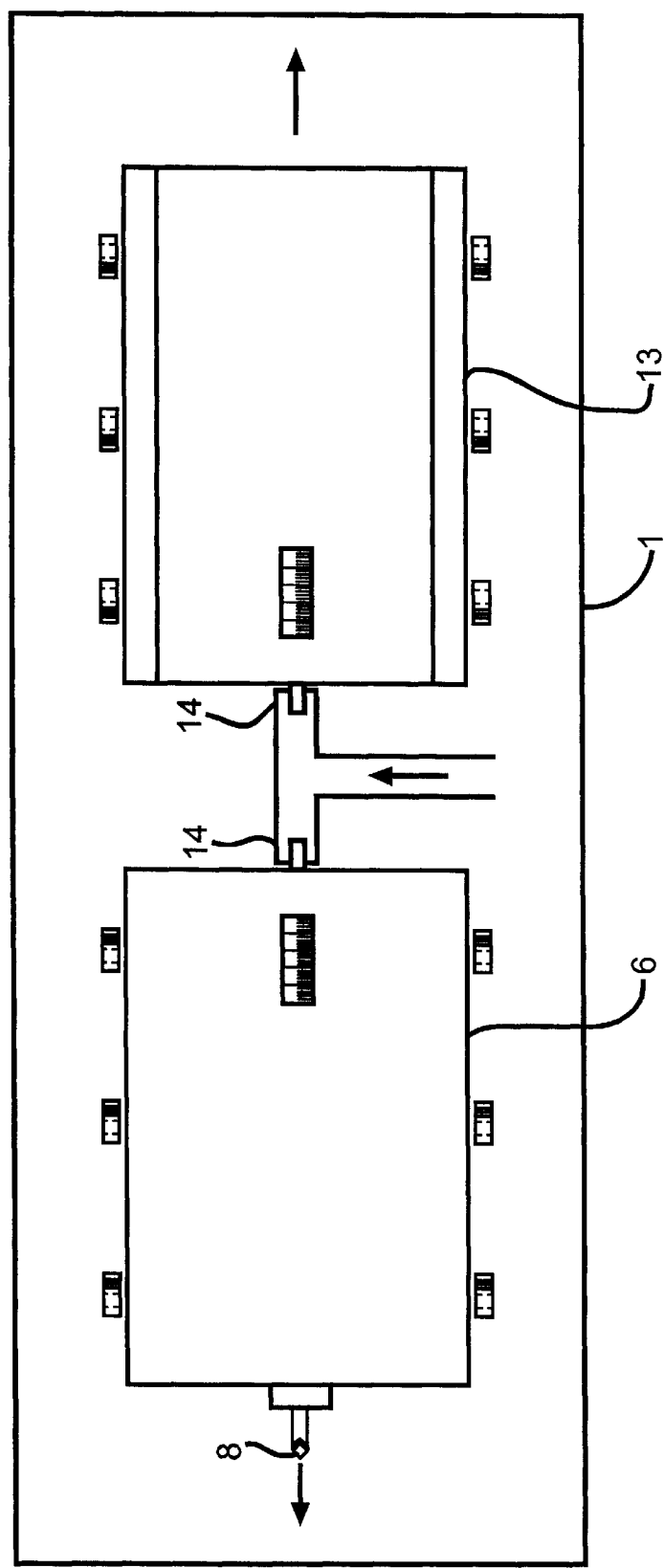
FIG. 5 shows a representation of the principle of a linear drive for the turning tool with the aid of a hydraulic or pneumatic linear motor.

An analogous device having hydraulically or pneumatically operating drives is shown in FIG. 5. The rotors are realized in this case by counteroperating pistons 14.

As an alternative to this, the counterbalancing can be effected by introducing force into a large mass. As shown in FIG. 2, for this purpose the machine bed 1 is designed as a large mass. The mass is dimensioned in such a way that its resulting movement has an amplitude of less than 0.005 mm.

Figure 6:
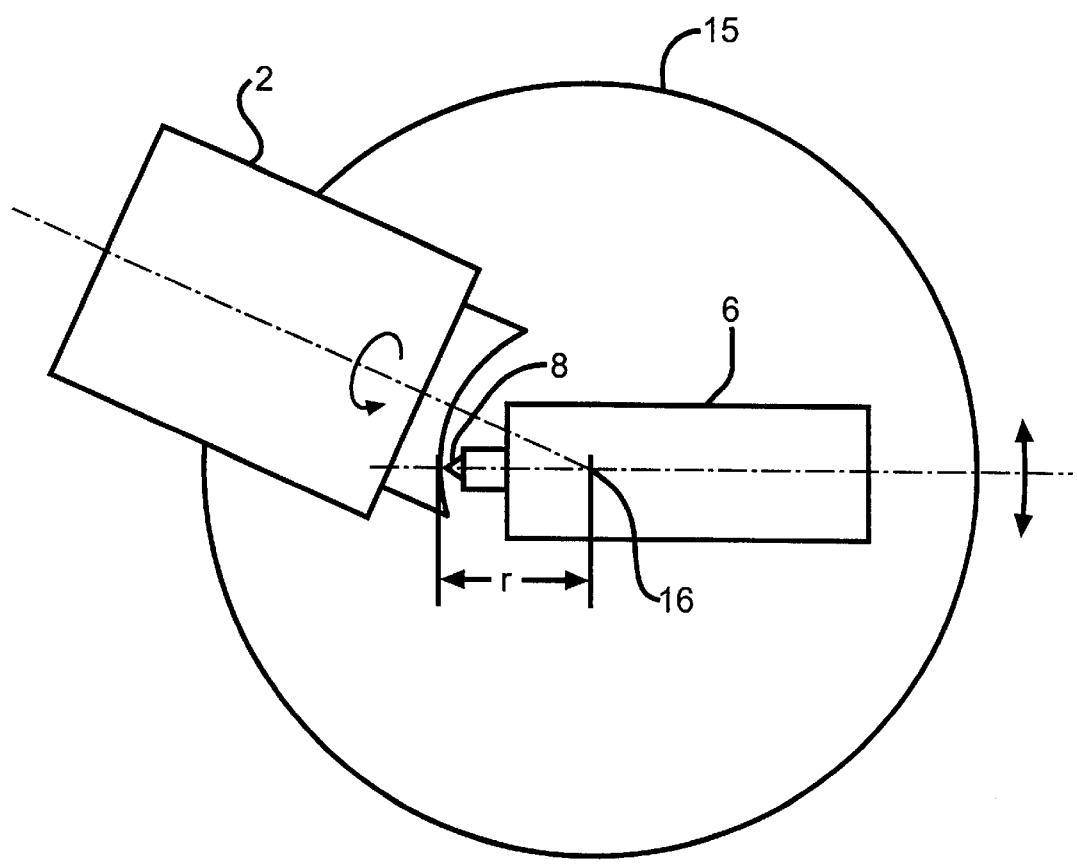
FIG. 6 shows a representation of the principle of a processing machine having a pivoting axis.

FIG. 6 shows a machine design in which, instead of a carriage movement in the X-direction, provision is made for a pivoting movement of the blank. The spindle 2 is mounted for this purpose on a rotary table 15. The pivoting centre point 16 is located on the Z-axis. The pivoting movement must be executed with a suitable radius r, which can be selected such that the additional movement, superimposed on the pivoting movement, of the turning tool 8 in the direction of the Z-axis is a minimum.

Figure 7:
FIG. 7 shows a representation of the principle of turning a blank in two different positions.

FIG. 7 shows how the centre singularity is mastered. The blank is turned in two eccentric positions deviating slightly from one another, turning not being carried out as far as the spindle axis. In the representation, the eccentric positions are shown diagrammatically exaggerated. The broken line in FIG. 7 is not executed, and the region respectively not processed is then covered by the other position.

Figure 8:
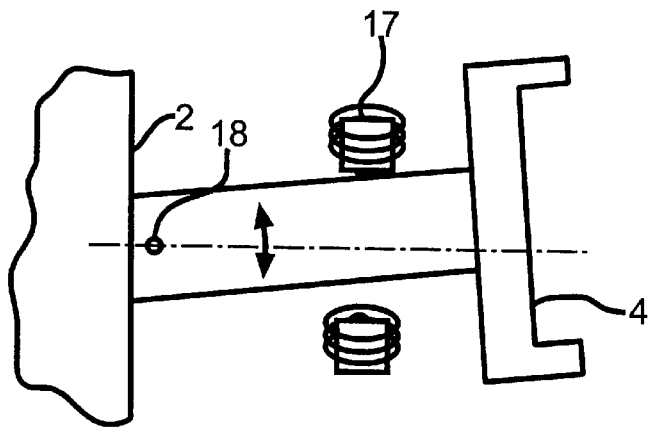
FIG. 8 shows the principle of workpiece adjustment in two different positions.

The workpiece support 4 of the spindle 2 is designed for this purpose to be slightly pivotable. The workpiece support 4 can be displaced in two different positions upwards and downwards by rotation about a fulcrum 18 by means of magnetic force effected by switchable electromagnets 17, as shown in FIG. 8.

Figure 9:
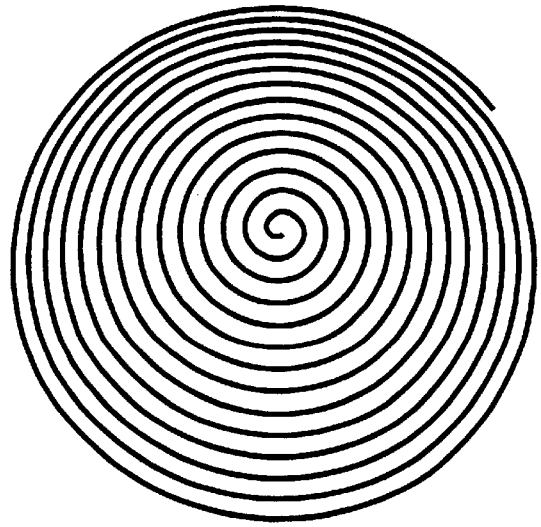
FIG. 9 shows the dynamic adjustment, for example, of the turning tool in the X-direction in the case of turning in two off-axis positions.

In order in this case not to let the turning movement at the edge of the blank run off the latter, it is provided in accordance with FIG. 9 to vary the infeed movement in the X-direction.

Figure 10:
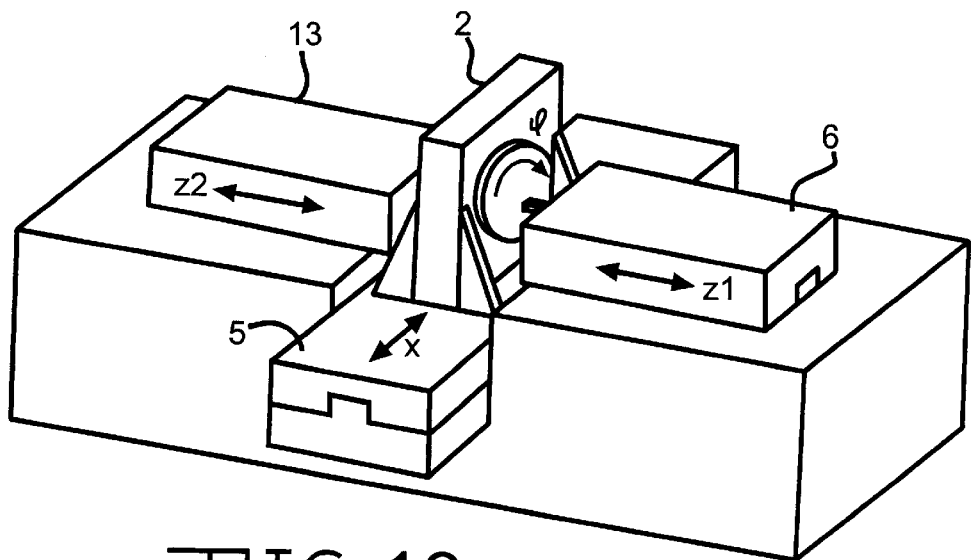
FIG. 10 shows a further variant for the design of a processing machine with simultaneous processing of the front and rear sides of an ophthalmic lens.

FIG. 10 shows a variant of a processing machine in which dynamic counterbalancing according to the invention is utilized in order simultaneously to process the second side of the blank. The spindle 2 is mounted on a carriage 5 in this case. The workpiece support 4 is constructed such that the blank can be processed from both sides. Provided on both sides of the spindle 2 are tool drives 6, 13 which operate in opposite directions. The desired optical effects can thus likewise be distributed on both sides of the ophthalmic lens.

Figure 11:
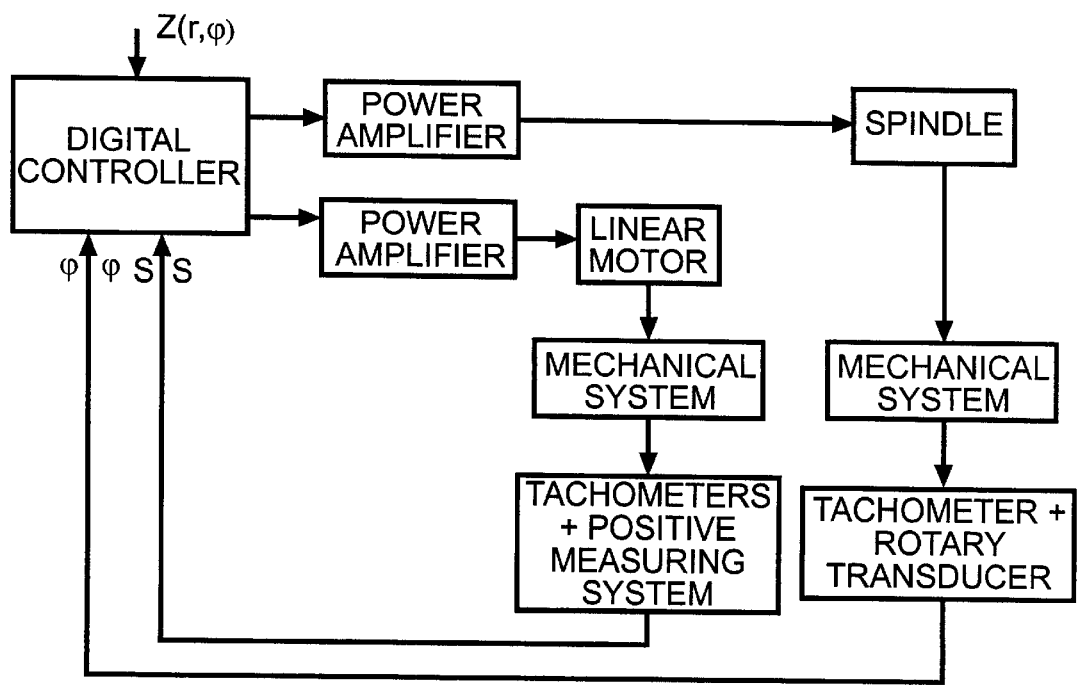
FIG. 11 shows the block diagram for a design of the controller.

Finally, FIG. 11 shows a block diagram of a control loop for controlling movements of the spindle 2 and of the turning tool 8. Use is made of a digital controller, for example a signal processor, which permits optimum adaptation to the controlled system. The structure and optimization of parameters can be performed as a function of the workpiece geometry. All the parameters describing the system state (mechanical system, tachometers, position-measuring systems) are fed to the digital controller. The slow movement in the X-direction can likewise be served by the controller. This controlled system is not presented in FIG. 11. The power amplifiers for the motors are driven taking account of the desired value. The required dynamics of the amplifiers should be 100 dB. An appropriate bandwidth is to be provided for modulating fine structures. The desired data for the movements can be generated before processing and stored in a memory. However, the desired data are preferably calculated online using the function Z(r,phi) describing the surface.

In this description, an ophthalmic lens is understood as spectacle lenses, contact lenses and intraocular lenses. Optical surfaces are optically active surfaces of lenses, mirrors or other optical components which are distinguished by their behaviour in transmitting or reflecting the electromagnetic radiation (in particular in the infrared, visible and ultraviolet spectral regions).

What is claimed is:

1. Apparatus for producing an ophthalmic lens or a mold for producing such a lens, and having, in both cases, an optical surface, said apparatus comprising a spindle which carries a workpiece support for holding a blank from which the lens or mold is to be produced, the spindle having a longitudinal axis and being mounted for rotation about its longitudinal axis, a drive for rotating the spindle, a turning tool which is mounted for movement in a direction transverse of the axis of the spindle, and in a direction parallel to the axis of the spindle toward and away from the spindle, and a mover for causing movement of the tool during each spindle rotation so that the distance between the tool and a blank in the workpiece support changes as required in accordance with prescribed or online-calculated data of the optical surface, characterized in that the tool mover which is operable to cause the tool to move toward and away from a blank in the workpiece support comprises at least one linear motor, and in that the apparatus includes at least one static or dynamic counterbalance operable to balance the reaction force when there is relative movement of the tool toward a blank in the workpiece support.

2. Apparatus as claimed in claim 1 wherein the counterbalance comprises a second turning tool and a dedicated drive which is operable to move the second turning tool in a direction parallel to the axis of the spindle.

3. Apparatus as claimed in claim 1 which additionally includes a cooler for said linear motor or for each of said linear motors.

4. Apparatus as claimed in claim 3 wherein said cooler or each of said coolers utilizes the Peltier effect to absorb heat from said linear motor or motors.

5. Apparatus as claimed in claim 3 wherein said cooler or each of said coolers is operable to transfer heat from said linear motor or motors to a heat transfer fluid.

6. Apparatus as claimed in claim 4 which is operable to transfer heat absorbed by the Peltier effect to a heat transfer fluid.

7. Apparatus for producing an ophthalmic lens or a mold for producing such a lens, and having, in both cases, an optical surface, said apparatus comprising a spindle which carries a workpiece support for holding a blank from which the lens or mold is to be produced, the spindle having a longitudinal axis and being mounted for rotation about its longitudinal axis, a drive for rotating the spindle, a turning tool which is mounted for movement in a direction parallel to the axis of the spindle toward and away from the spindle, one of the spindle and the turning tool being movable in a direction transverse of the axis of the spindle, and a mover for causing movement of the tool toward and away from the spindle during each spindle rotation so that the distance between the tool and a blank in the workpiece support changes as required in accordance with prescribed or online-calculated data of the optical surface, characterized in that the tool mover which is operable to cause the tool to move toward and away from a blank in the workpiece support comprises a linear drive, and in that there is a cooler for the linear drive which utilizes the Peltier effect.

8. Apparatus as claimed in claim 7 which is operable to transfer heat absorbed by the Peltier effect to a heat transfer fluid.

9. Apparatus for producing an ophthalmic lens or a mold for producing such a lens, and having, in both cases, an optical surface, said apparatus comprising a spindle which carries a workpiece support for holding a blank from which the lens or mold is to be produced, the spindle having a longitudinal axis and being mounted for rotation about its longitudinal axis, a drive for rotating the spindle, a turning tool which is mounted for movement in a direction parallel to the axis of the spindle toward and away from the spindle, one of the spindle and the turning tool being movable in a direction transverse of the axis of the spindle, and a mover for causing movement of the tool toward and away from the spindle during each spindle rotation so that the distance between the tool and a blank in the workpiece support changes as required in accordance with prescribed or online-calculated data of the optical surface, characterized in that the tool mover which is operable to cause the tool to move toward and away from a blank in the;workpiece support comprises a linear drive, in that there is a cooler for the linear drive which utilizes the Peltier effect, and in that the linear drive has a housing or stator, the reaction force effected by the acceleration of the linear drive is dynamically balanced by a second linear drive which has a second housing or stator which is mechanically coupled to the housing or stator of the first linear drive, and the second linear drive is colinear with the first linear drive, and is driven in a direction opposite to that in which the first linear drive is driven.

10. Apparatus for producing an ophthalmic lens or a mold for producing such a lens, and having, in both cases, an optical surface, said apparatus comprising a bed, a spindle mounted on said bed which carries a workpiece support for holding a blank from which the lens or mold is to be produced, the spindle having a longitudinal axis and being mounted for rotation about its longitudinal axis, a drive mounted on said bed for rotating the spindle, a turning tool which is mounted on said bed for movement in a direction parallel to the axis of the spindle toward and away from the spindle, one of the spindle and the turning tool being movable in a direction transverse of the axis of the spindle, and a mover mounted on said bed for causing movement of the tool toward and away from the spindle during each spindle rotation so that the distance between the tool and a blank in the workpiece support changes as required in accordance with prescribed or online-calculated data of the optical surface, characterized in that the tool mover which is operable to cause the tool to move toward and away from a blank in the workpiece support comprises a linear drive, in that there is a cooler for the linear drive which utilizes the Peltier effect, and in that the linear drive is coupled to the bed of the apparatus so that the reaction force effected by the acceleration of the linear drive is transmitted to the bed, and characterized further in that the apparatus includes a force counterbalancer which applies to the bed a force which dynamically balances that transmitted to the bed as a consequence of the reaction force effected by acceleration of the linear drive.

11. Apparatus as claimed in claim 10 wherein the spindle is carried by a carriage, and is positioned above the carriage, and characterized in that the carriage is movable in a direction transverse of the axis of the-spindle and, when so moved, imparts such movement to the spindle.

12. Apparatus for producing an ophthalmic lens or a mold for producing such a lens, and having, in both cases, an optical surface, said apparatus comprising a spindle which carries a workpiece support for holding a blank from which the lens or mold is to be produced, the spindle having a longitudinal axis and being mounted for rotation about its longitudinal axis, a drive for rotating the spindle, a turning tool which is mounted for movement in a direction parallel to the axis of the spindle toward and away from the spindle, one of the spindle and the turning tool being movable in a direction transverse of the axis of the spindle, and a mover for causing movement of the tool toward and away from the spindle during each spindle rotation so that the distance between the tool and a blank in the workpiece support changes as required in accordance with prescribed or online-calculated data of the optical surface, characterized in that the tool mover which is operable to cause the tool to move toward and away from a blank in the workpiece support comprises a linear drive which comprises a hydraulic motor, and in that there is a cooler for the linear drive which utilizes the Peltier effect.

13. Apparatus as claimed in claim 12 characterized in that said hydraulic motor is an electrodynamic linear motor.

14. Apparatus as claimed in claim 13 characterized in that the rotor of said electrodynamic linear motor is supported on air-cushioned bearings.

15. Apparatus as claimed in claim 13 characterized in that the rotor of said electrodynamic linear motor is supported on air-cushioned bearings and supporting magnet bearings.

16. Apparatus as claimed in claim 12 characterized in that the rotor of said linear motor is hydraulically mounted.

17. Apparatus for producing an ophthalmic lens or a mold for producing such a lens, and having, in both cases, an optical surface, said apparatus comprising a spindle which carries a workpiece support for holding a blank from which the lens or mold is to be produced, the spindle having a longitudinal axis and being mounted for rotation about its longitudinal axis, a blank supported in the workpiece support being coaxial with the spindle and-having two opposed surfaces which are spaced from one another along the axis of the blank, a drive for rotating the spindle, a turning tool which is mounted for movement in a direction parallel to the axis of the spindle toward and away from the spindle, one of the spindle and the turning tool being movable in a direction transverse of the axis of the spindle, and a linear drive which is operable to cause movement of the turning tool toward and away from one of the two opposed surfaces of the workpiece, characterized in that there is a cooler for the linear drive which utilizes the Peltier effect, in that the apparatus also includes a second turning tool which is mounted coaxially of the first for movement in a direction parallel to the axis of the spindle toward and away from the second of the two opposed surfaces of the blank, and a second linear drive operable to cause movement of the second turning tool toward and away from the second of the two opposed surfaces of the workpiece, a measuring system for determining the position of the second turning tool, and in that the spindle is carried by a carriage which is movable in a direction transverse of the axis of the spindle and, when so moved, imparts such movement to the spindle, and the spindle is positioned above the carriage.

18. Apparatus as claimed in claim 17 which has a machine bed, wherein there are housings or stators for the two linear drives, characterized in that there is a third linear drive which is colinear with the first two linear drives, the third linear drive is operable to effect a force opposite that effected by the other two linear drives, and has a housing or stator, and in that the three housings or stators are mechanically coupled through the machine bed to provide additional dynamic counterbalancing.

* * * * *